United States Patent [19]
Roblyer

[11] 3,750,391
[45] Aug. 7, 1973

[54] HOT GAS ENGINE
[76] Inventor: Steven P. Roblyer, 376 E. Montana, Glendale Heights, Ill. 60137
[22] Filed: Dec. 9, 1971
[21] Appl. No.: 206,246

[52] U.S. Cl. .................................. 60/24, 60/59 T
[51] Int. Cl. ............................................ F02g 1/04
[58] Field of Search ...................... 60/36, 592, 59 T

[56] References Cited
UNITED STATES PATENTS
2,685,173   8/1954   Percival .......................... 60/59 R
3,022,235   2/1962   Brown ............................. 60/105 X FOREIGN PATENTS OR APPLICATIONS
13,206   9/1888   Great Britain ........................ 60/24
18,665   9/1905   Great Britain ........................ 60/24

OTHER PUBLICATIONS
Ford Motor Company Advertising Circular, May 1956.

Primary Examiner—Martin P. Schwadron
Assistant Examiner—Allen M. Ostrager
Attorney—George F. Dvorak et al.

[57] ABSTRACT

A hot gas engine construction employing either external combustion, internal combustion, or a combination of both internal and external combustion. The engine has a fresh air or gas intake means connected to a casing with a motor connected to the opposite end of the casing, and a chamber in the casing having heat supplied thereto by either heat exchangers or by internal ignition of combustionable fluids thereby effecting the expansion of the gas and the increase of the pressure in the chamber between the intake means and the motor means. This forces the heated gases out of the chamber through the motor effecting the driving of the motor which has its output connected through suitable means to a load to be driven along with being drivingly connected to the intake means for effecting the operation of the same to introduce fresh air or gas into the chamber.

12 Claims, 4 Drawing Figures

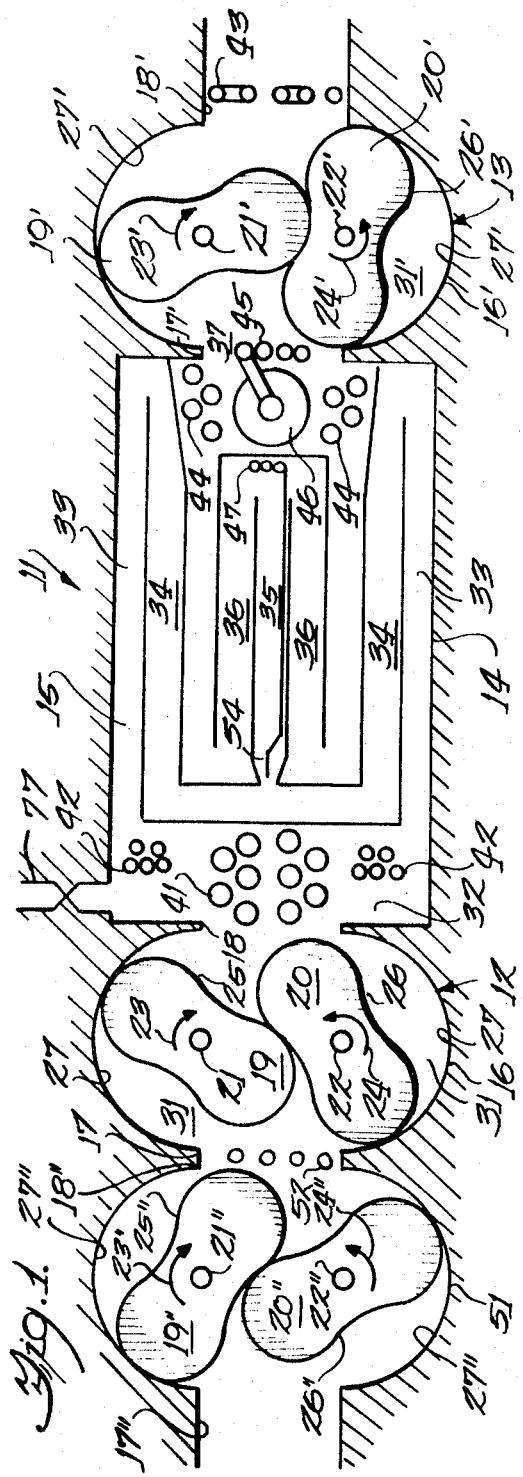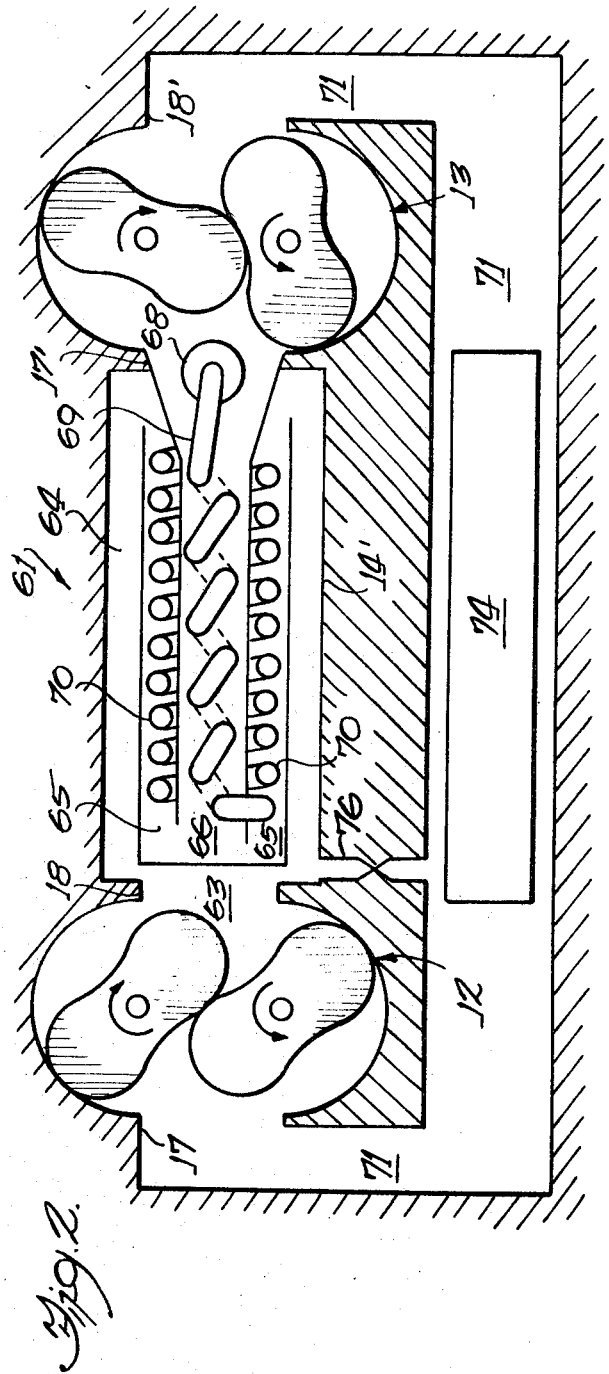

Inventor
Steven P. Roblyer

HOT GAS ENGINE

BACKGROUND OF THE INVENTION

Present day engines are mainly of the internal combustion types such as the Otto cycle, Diesel cycle, and the gas turbine.

The Otto and Diesel engines operate by compressing the fuel-air mixture inside the engine cylinder, igniting the mixture, and deriving power from the combusted mixture as it expands in the engine at greater pressure. Of the shortcomings and disadvantages of this type of engine, there are five basic shortcomings most outstanding which cause loss of energy which would otherwise be available to the engine. Firstly, the pressures existing at combustion prevent high compression ratios which would otherwise be desirable in order to make use of the available energy lost due to the unused volume of air existing in the top of the cylinder. Secondly, the fuel-air mixture must burn rapidly, but not explosively, so that the mixture begins burning before the piston reaches the top of the cylinder and continues the burning process as the piston starts downward in the cylinder. Thus, the fuel which burns prior to the piston reaching the top of its stroke in the cylinder acts against the force of the power stroke of the engine. Further, the fuel that burns after the piston has initiated its downward stroke contributes only after it has burned so that full advantage of the burning and combustion process is not available to the piston. Thirdly, the combusted air is still expanding from the energy in it at the bottom of the power stroke with this energy of expansion being lost out the engine exhaust with the requirement that a muffler or silencer must be provided due to the significance of the degree of energy being lost. Fourthly, the heat in the escaping exhaust gases cannot be directly recovered and incorporated directly in the Otto or Diesel cycles due to the nature of their cycles. Fifthly, both the Otto and Diesel engines do not provide for complete combustion due to the restrictions of fuel burning time and the nature of fuel ignition in each type of engine. This results in the incomplete combustion products being discharged with the exhaust gases thereby polluting the surrounding atmosphere not only due to the carbon monoxide produced by combustion and being discharged, but also due to the hydrocarbon pollutants being discharged due to the incomplete combustion process.

A major consideration in the design of combustion engines today is directed at improving the combustion efficiency to reduce the amount of pollutants discharged to the surrounding atmosphere while maintaining a high thermal efficiency of the engine. As is well known, because the combustible charge in internal combustion engines is not always completely consumed during the ignition and combustion phase, the exhaust products discharged to the atmosphere from the engine contain elements which contribute to the problem of air pollution. Some of these products are considered a hazard in that they not only pollute, but they also serve to contaminate the atmosphere.

In addition, incomplete combustion in the usual type of combustion engine is very inefficient in itself in that it tends to increase the fuel comsumption of the engine.

SUMMARY OF THE INVENTION

Consequently, it is one of the principle objects of the present invention to provide a hot gas engine which overcomes these and other disadvantages.

The present invention provides the advantages of having a continuous combustion process rather than combustion having to take place in timed cycles as in the Otto and Diesel engines. Further, the combustion chamber of the invention may be of any desired size and design which facilitates complete combustion of the fuel. A choice of any practical fuel can be used in the engine thus substantially lowering operating costs. Further, engine efficiency is readily increased by recovering the heat of the exhaust gases and using the recovered heat to heat the air in the chamber. Still further, the gas in the chamber is permitted to fully expand before leaving the engine, this further increasing the efficiency of the engine while eliminating the need for power robbing mufflers.

The present invention has as one of its features the provision of being selectively operable as a combined internal-external combustion engine with the ability of also being operated as either one individually so that a typical usage might be to discontinue the internal combustion phase of operation in areas where no pollutants whatsoever may be discharged to the atmosphere so that the engine will continue operation completely in the external combustion phase with only a slight decrease in output as the loss of heat provided to the engine by the internal combustion process can be somewhat compensated for by increasing the heat provided to the engine by the external combustion sources.

In those areas where an engine must continuously run under conditions requiring minimum or no pollutants discharged to the atmosphere, the present invention has the feature where it can be provided strictly as an external combustion engine where the external combustion takes place in conditions most favorable to complete combustion of the combustible materials with the discharge from such external combustion being subjected to treatment so that the final discharge contains no pollutants whatsoever while at the same time the heat supplied to the engine is uneffected by such treatment so that engine efficiency remains the same regardless of the treatment provided to the external combustion discharge to remove pollutants therefrom.

When operating the present engine as an external combustion engine, this permits combustion to take place in a carefully controlled environment so that complete combustion is assured with no undesirable products being discharged to contaminate the atmosphere, thus eliminating the problem of unburnt contaminants in the exhaust products ejected from the engine as no combustion would take place within the engine itself.

In the internal combustion engine, where the fuel is burnt at high temperature in explosive conditions, noxious pollutants are emitted. By comparison, the present engine, when operated as an external combustion engine, would produce virtually no pollutants, even when hydrocarbon fuel is being used for heating the cylinders, for external combustion takes place in conditions which can be carefully controlled. Further, as the engine can be driven by any heat source which may be readily available, and as there are many other possible heat sources other than hydrocarbon fuels, it is envisioned the development of special fuels for use with the engine which would completely eliminate the problem of pollutants emitted by engines to the surrounding atmosphere.

A feature of the present invention is that when operated as an internal combustion engine either by itself or in combination with external combustion, the matter of unburnt combustion products is attended to by the novel engine construction such that due to the design of the combustion chamber and surrounding air-flow passages the combustion will be substantially completed with substantially all the fuel contained in the combustion chamber being burnt along with any contaminants therein prior to the ejection of the exhaust gases to the surrounding atmosphere.

A further feature is the provision of an internal combustion chamber which provides an environment for efficient combustion of the combustible charge so that fuel consumption will be improved as substantially all the fuel will be consumed upon initial combustion, with the heat of combustion being maintained and combustion continued so that contaminants in the exhaust are substantially minimized if not completely eliminated.

A further feature of this invention is its having a constant torque over a wide operating range which allows the engine to be used on widely varying loads with fewer torque conversion requirements than present engines.

A further feature is the provision of an engine which can be started with a high torque from an initial stationary position and which can be directly connected to the load to be driven with the elimination of any intermediate clutches, gear shifts, torque convertors, or any other of the heavy type of drive trains presently required when coupling an engine to the load to be driven.

A further feature is the provision of an engine structure in component parts in which the respective portions forming the overall engine can be readily removed as individual units for inspection, repair, and replacement with a mimimum of time and equipment being required.

A further feature is the provision of an engine which can run on almost any type of fuel, has a mimimum of moving parts providing for an extended engine life, requires little maintenance, can be mounted and run for indefinite periods in any engine position whatsoever, and is practically free of noise.

Still a further feature of the invention is to provide an external combustion engine in a closed and sealed system where the system can be initially pressurized and the operating gas selected thereby maximizing the efficiency obtained by the engine for its selected purpose.

A further feature of the invention is a convenient compressed air source by means of a connection to the chamber.

Further features of the invention are directed to improvements which represent improved operating and wear characteristics, simplicity of manufacture, elimination and/or reduction in problems of alignment of parts, minimization of moving parts, and engine parts which are readily interchangeable so that only a minimum of parts need be maintained on hand for servicing and repair of the engines when required.

As the present engine will largely eliminate noise, will minimize the production of noxious pollutants discharged to the surrounding atmosphere, is capable of being run on various types of fuel or other sources of heat, and has few moving parts so that maintenance of the engine is greatly minimized, it is apparent that this is an engine which can be of exceptional benefit to the public as an inexpensive, reliable and generally pollution free engine.

The engine of the present invention generally comprises a casing having a chamber therein with heat exchangers of an external-combustion source or an internal-combustion source or both being disposed in the chamber, a positive displacement compressor connected to one end of the casing and opening into the chamber for supplying air or gas thereto, a motor connected to the other end of the casing and in communication with the chamber in the casing such that the heated expanded gas from the chamber passes through the motor and does work on the same by driving the motor, the output of the motor in turn being drivingly connected to the input of the compressor to drive the compressor at a given ratio such that the motor is always turning at a greater speed than the speed of the compressor or should the compressor and motor be of different designs, then the motor is always turning with a greater volume flow through it than the compressor. Thus, the air or gas is heated within the chamber thereby causing a pressure buildup in the chamber and forcing the hot air to flow out the motor driving the same which, in turn, through a mechanical coupling with the compressor, drives the compressor in a manner to admit fresh air or gas into the chamber. The hotter the air is heated, the greater the expansion and pressure differential, and the greater the torque of the motor which results in greater efficiency of the engine.

BRIEF DESCRIPTION OF THE DRAWINGS

The accompanying drawings show for the purpose of exemplification, without limiting the invention or claims thereto, certain practical embodiments illustrating the principals of this invention wherein:

FIG. 1 is a diagrammatic view of an embodiment of the present invention illustrating an internal-external combustion engine;

FIG. 2 is a diagrammatic view of another embodiment of the present invention illustrating an external combustion engine connected for operation in a sealed closed-loop system;

DESCRIPTION OF THE PREFERRED EMBODIMENTS

Figure 3:
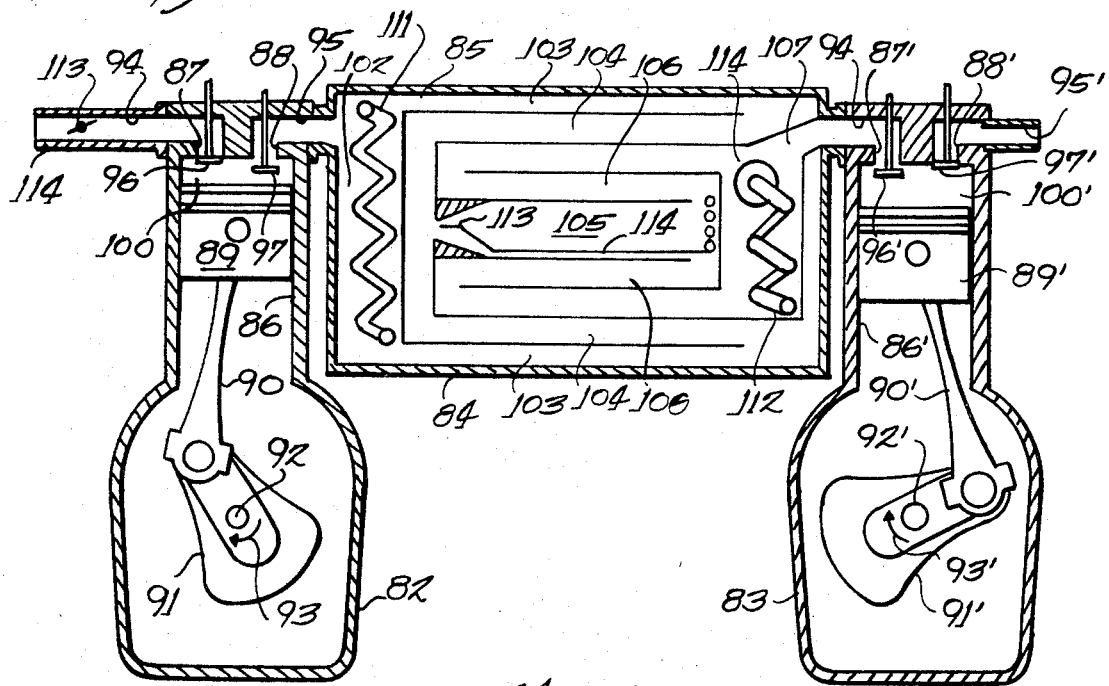
FIG. 3 is a diagrammatic view of another embodiment of the present invention illustrating an internal-external combustion engine similar to the engine of FIG. 1 but utilizing a compressor and motor of the reciprocating type.

In the drawings, wherein for the purpose of illustration is shown preferred embodiments of the invention, and referring to FIG. 1, there is indicated generally an engine 11 which comprises a positive displacement compressor 12 and a motor 13 interconnected by a casing 14 containing a chamber 15 in communication with the compressor and motor.

The compressor 12 is of the positive displacement rotary type comprising a housing 16 having an inlet port 17 and an oulet port 18 with two-lobe rotors 19 and 20 rotatively mounted on shafts 21 and 22 for rotation in opposed directions as indicated by the arrows 23 and 24. The outer peripheral portions 25 and 26 of the two-lobe rotors 19, 20 are disposed in sealing engagement with the inner peripheral surface 27 of the compressor housing 16, and rotate in a manner as to always maintain peripheral contact with each other and with the peripheral inner surface 27 of the compressor housing 16 so that there is always a continuous seal between the inlet port 17 and outlet port 18 with fresh air entering the inlet port, being compressed, and discharged through the outlet port to the chamber 15. Working chambers 31 are defined between the rotor peripheral surfaces 25, 26 and the interior surface 27 of the compressor housing 16. It will be apparent therefore that, as the rotors rotate relative to one another and relative to the housing 16, the working chambers 31 will transfer air from the volume adjacent to the inlet port 17 to the outlet port 18 where the compressed volume would then be discharged to the chamber 15.

The motor 13 is identical to the compressor 12, with like reference numerals being utilized to indicate like parts 16' to 27' respectively. However, it should be understood that the invention is not limited to the specific embodiment shown having two rotary rotors of the two-lobe type as other combinations may be used, such as the type using three-lobe rotors, sliding vane, or helical lobe.

The compressor outlet port 18 is connected to the casing 14 and opens into chamber 15 in the casing. The inlet opening 17' of the motor 13 is connected to the opposite end of the casing 14 and opens into chamber 15 in the casing. The chamber 15 is divided into a series of interconnected chambers and passages 32 to 37 forming a tortuous path along which the air flow is directed through chamber 15. Disposed in chamber 32 are heat exchanger coils 41 along with the coils 42 of a recovery heat exchanger. Heat exchanger 41 is connected to an external heat source (not shown) with heat exchanger 42 being connected to coils 43 disposed in outlet port 18' of the motor 13. Disposed in chamber 37 are the coils of a second heat exchanger 44 and a third heat exchanger 45. Heat exchanger 44 is connected to an external heat source (not shown) with heat exchanger 45 being connected to an external combustion chamber 46 in which combustion takes part outside the environment of the engine but with the heat from the combustion chamber being available to the air flowing thereover passing through chamber 37.

The chamber 35 also forms the internal combustion chamber with reference numeral 54 designating an assembly consisting of a fuel injection jet and igniter with the fuel directed to the same first passing through fuel heating coils 47 disposed in the juncture between chambers 35 and 36 to preheat the fuel prior to ignition.

The rotors 19',20' of the motor 13 are connected to a load to be driven by the engine along with also being connected by suitable mechanical means (not shown) to the input shafts 21, 22 of the compressor 12 so as to drive the compressor rotors 19, 20 in a predetermined ratio relative to the rate of rotation of the rotors 19', 20' of the motor. The ratio of rotation of the rotors 19', 20' of the motor 13 to the rotors 19, 20 of the compressor ranges from a minimum ratio where the volume of air through the motor is slightly greater than the volume of air through the compressor, up to a maximum ratio where, for the particular temperatures and pressures in the engine, the mechanical advantage of the motor would no longer provide the work required to drive both the load and the compressor. The maximum ratio limit is a design criterion which will vary depending on the efficiency of the compressor and motor, the requirements of the load to be driven, the maximum temperature in the chamber 15, etc.

The rotors 19, 20 and 19', 20' are disposed in their respective housings 16, 16' and rotate in a manner as to always maintain peripheral contact with each other and with their respective interior surfaces 27, 27' of their respective housings so that the chamber 15 in the casing 14 is always maintained closed from the intake port 17 of the compressors 12 and the outlet port 18' of the motor 13.

In operation, starting from zero rotation of the motor 13 and compressor 12 with chamber 15 initially unheated and the air contained therein being at the same temperature as the air outside the engine 11, the air within the chamber 15 is initially heated by introducing heat therein by heat exchangers 44 and 45 along with initiating the internal combustion process in chamber 35. This heating process rapidly heats the air in the chamber 15 causing an expansion of the same and a pressure buildup in the chambers 32 to 37, this pressure buildup forcing the expanded air to flow out of the chamber 15 and impinge against the rotors 19', 20' of the motor 13 effecting the rotation of the same which, in turn, through the mechanical coupling with the compressor 12, effects the rotation of the compressor rotors 19, 20 in a direction to admit fresh compressed air to the chamber 15.

The fresh air enters the inlet port 17 of the compressor 12 and flows into chamber 31 where it is then trapped between the interior surface 27 of the compressor housing 16 and the peripheral surfaces 25, 26 of the rotors 19, 20 as the rotors 19, 20 turn and seal off the intake port 17. The air is then discharged from the compressor 12 through outlet port 18 into chamber 32 where it comes in contact with heat exchangers 41 and 42 which begin the heating and expansion of the air. The heated air then flows in a stream through passages 33 and 34 after which it is introduced to the combustion chamber 35 where it is further heated by the internal combustion process taking place at assembly 54. This further heated air then flows out of combustion chamber 35, through passages 36, and into chamber 37 where it is further heated by heat exchangers 44 and 45 and the walls of the external combustion chamber 46 which further heats and causes further expansion of the air. In flowing from chamber 35 to passage 36, the heated air passes over and around fuel heating coils 47 to preheat the fuel prior to its being ignited at assembly 54.

From chamber 37, the expanded heated air flows out of chamber 15 into inlet port 17' of the motor 13 where the air impinges upon the motor rotors 19', 20' effecting the rotation of the same, after which the air is discharged from the motor through outlet port 18' passing over heat exchanger coils 43 prior to the discharge of the air from the engine 11. Coils 43 recover some of the heat from the discharged air which is then delivered to heat exchanger coils 42 disposed in chamber 32 for use in heating fresh air when introduced to chamber 15. Coils 53 thus recover heat which would otherwise be lost to the surrounding atmosphere.

The hotter the air is heated in chamber 15, this being controlled by the amount of heat introduced by the heat exchangers and internal combustion process, the greater the expansion of the air therein, the greater the pressure differential created in the chamber, and thus the greater the speed of the motor 13.

Should internal combustion not be wished, then the control of fuel to assembly 54 is cut-off by suitable means (not shown) so that the engine would then operate as an external combustion engine, the difference in heating being only that chamber 35 would not be utilized for combustion purposes but merely as a passage to direct the heated air to which heat would be provided by heat exchangers 41, 42, 44 and 45 by external heat sources. It is possible for the engine to maintain the same power output by increasing the heat supplied to the engine by the heat exchangers when discontinuing the internal combustion process so that approximately the same amount of air expansion would take place in the chamber 15.

The air stream through the various chambers and passages 32 to 37 is such that the air is continually heated and further expanded as it progresses through the tortuous path with the coolest air flowing in the outermost passages 33 thereby providing an insulating blanket immediately inside the casing 14 thus preventing excessive loss of heat from the engine while minimizing any cooling or insulation required externally of the engine.

In order to increase the power output of the motor, there is provided a super charger compressor 51 which is of the same design as the compressor 12 and motor 13 so that reference numerals 17'' to 27'' are utilized to identify like parts of the super charger. The volume of air passing through the super charger 51 exceeds the volume of air through the compressor 12 and is mechanically coupled by suitable means (not shown) to the compressor for driving by the same. The super charger 51 enhances the degree of combustion of fuel at the assembly 54 in the internal combustion chamber 35 by raising the air density inside the engine 11, this also serving to increase the power output from the motor 13. The super charger increases the engine compression ratio thereby obtaining a more compact and powerful engine.

Cooling coils 52 may be provided between the outlet port 18'' of the super charger and the inlet port 17 of the compressor in order to cool the air heated by the compression process in the super charger prior to the introduction of the air to the compressor, this serving to reduce the power consumed by the super charger.

Referring to FIG. 2 there is disclosed another embodiment of the present invention where reference numeral 61 designates an engine similar to engine 11 but being completely of the external-combustion type rather than of the internal-external combustion type. Parts shared between this engine 61 and engine 11 of FIG. 1 are the compressor 12 and the motor 13, with like reference numerals being used to designate like parts throughout. A casing 14' having a chamber 63 therein is connected between the compressor 12 and motor 13 with one end of chamber 63 being in communication with outlet port 18 of the compressor, and the other end of chamber 63 being in communication with inlet port 17' of the motor 13. The chamber 63 is divided into passages 64, 65, and 66 so that gas entering the chamber 63 first flows in a stream along passage 64 disposed adjacent the interior wall surfaces of the casing 14', the gas stream then being reversed and directed through passage 65, after which the gas stream is again reversed and flows through passage 66 into motor 13. An external combustion chamber 68 is located in chamber 63 at the end of passage 66 nearest the motor 13 and is connected to heat exchanger coils 69 initially disposed along the length of passage 66 and extending therefrom by coils 70 along the length of passage 65. The external combustion chamber 68 is connected to an external heat source (not shown) for providing heat to the same. The combustion chamber 68 and coils 69 and 70 are disposed in the passages 65 and 66 in a manner such that the maximum heat is available at the combustion chamber 68 with the heat diminishing as it progresses further away from the combustion chamber along the passage 66 through coils 69, with the heat diminishing still further as it passes back along the passages 65 through coils 70 which terminate approximately at the entrance to passage 65. Thus, the coolest gas enters chamber 63 and flows through passage 64 effecting the cool gas blanket between the interior of the engine and the interior surface of the casing 14' minimizing the insulation required for the same, after which the gas streams through passage 65 contacting initially the coolest of the heat exchanger coils 70, the gas being continually heated and expanding as it comes in contact with progressively hotter coils 70, after which the gas streams through passage 66 being still further heated and expanded as it contacts progressively hotter coils 69 until at last it streams around the exterior of the external combustion chamber 68 receiving the maximum heat prior to the gas being discharged to motor inlet port 17' and into the motor 13 where the expanded gas effects the rotation of the rotors in the same manner as described above in reference to FIG. 1.

The outlet port 18' of the motor 13 is connected by passage 71 to the inlet port 17 of the compressor 12. Cooling coils 74 are disposed in passage 71 for cooling the heated gas discharged from the motor prior to the gas being admitted to the compressor 12.

By utilizing this sealed type of closed-loop engine system for external combustion engine 61, it is possible to pre-pressurize the gas used in the system to obtain the maximum power therefrom, along with being able to select the gas best suited for increasing engine efficiency. An example would be the use of helium as the working gas and pre-pressurizing the gas throughout the engine system to a value of about 10 atmospheres thus greatly increasing the power of the engine as helium has a higher thermal conductivity than air, providing fast heat absorption and loss.

A bypass valve 76 is interposed between chamber 63 and passage 71 to permit the engine to have a braking effect on the driven load. Opening the bypass valve 76 will shunt air from chamber 63 directly to passage 71 thereby providing a braking torque effect on the motor 13 and the load driven thereby.

Similarly, referring to FIG. 1, a bypass valve 77 is utilized with engine 11 and is connected to chamber 15 at one end with the opposite end being open to the ambient atmosphere so that by opening the bypass valve air will be shunted from chamber 15 to the atmosphere thereby providing a braking torque on the motor 13 and the load driven thereby.

Referring to FIG. 3, there is disclosed a further embodiment of the present invention where reference numeral 81 designates an internal-external combustion engine comprising a compressor 82 and a motor 83 interconnected by a casing 84 having a chamber 85 therein. The compressor 82 includes a cylinder 86 having an inlet port 87 and a discharge port 88 with a reciprocating piston 89 disposed in the cylinder and connected by a piston rod 90 to a crank shaft 91 which rotates about the shaft 92 in the direction shown by the arrow 93. An inlet passage 94 connects the inlet port 87 to the surrounding atmosphere, with a discharge passage 95 connecting the discharge port 88 to the chamber 85. Associated with the inlet port 87 is an inlet valve assembly 96, and associated with the discharge port 88 is a discharge valve assembly 97. Intake valve 96 controls the air flow from the intake passage 94 to chamber 100 which is defined between the top surface of the piston 89 and the interior surfaces of the cylinder 86. The discharge valve 97 controls the discharge of the air from chamber 100 to the discharge passage 95.

Motor 83 is identical to the compressor 82 so that reference numerals 86' to 100' designate like or similar parts.

Chamber 85 in casing 83 is divided into a series of interconnected chambers and passages 102 to 107 for directing the stream of air flow therethrough. Disposed in chamber 102 are the coils of a first heat exchanger 111 connected to an external heat source (not shown). Disposed in chamber 107 are the coils 112 of a second heat exchanger which is also connected to an external combustion chamber 114. Chamber 105 comprises an internal combustion chamber having an assembly 113 for injecting and igniting the fuel provided thereto by fuel line 114, the fuel passing first through fuel heating coils 115 disposed between chambers 105 and passage 106 for preheating the fuel prior to its combustion at assembly 113.

The output shaft 92' of the motor is connected both to a load to be driven by the engine as well as being connected by suitable means (not shown) to drive the shaft 92 of the compressor 82 such that the compressor and motor turn in a given ratio with the motor always turning at a speed such that the volume of air passing therethrough is greater than that passing through the compressor.

The valves 96, 97 and 96', 97' open and close their respective ports in timed relationship to the movement of their respective pistons 89, 89' by any one of several means suitable for this purpose as known in this field of art.

In operation, starting from zero rotation, air is initially heated within the chambers and passages 102 to 107 by heat exchanger coils 111 and 112 as well as by the internal combustion process taking place in chamber 105. This heating process rapidly causes an expansion of the air within the chambers and passages thus effecting a pressure buildup therein, this pressure buildup forcing the heated expanded air to flow out of the chamber 85 and into the inlet passage 94' of the motor 83 where it is directed into the motor chamber 100' impinging on the piston 89' effecting the downward movement of the same. This causes the rotation of shaft 92' which, in turn, through the mechanical coupling with the compressor 82, effects the rotation of compressor shaft 92 in a manner to introduce fresh air into the chamber 85.

Considering a conventional cycle of the compressor 82, we start with the piston at its maximum upward position in the cylinder 86 with both inlet port 87 and outlet port 88 closed by their respective valves 96 and 97. The piston begins its downward movement in the cylinder and simultaneously therewith inlet port 87 is opened by valve 96 to admit fresh air into chamber 100. When the piston reaches its lowest position in the cylinder so that chamber 100 contains the maximum volume of air, the inlet port 83 is closed so that as the piston moves upwardly in the cylinder it compresses the volume of air in chamber 100 to the desired compression value. When the desired degree of compression is reached, the discharge port 88 is opened by valve 97 to permit the discharge of the compressed air from chamber 100 through discharge passage 95 into chamber 85. This discharge continues as the piston continues its upward movement until the piston reaches its maximum upward position in the cylinder, at which time the discharge port 88 is closed, thereby completing a cycle of operation for the compressor, after which the inlet port 87 is open to initiate a new cycle of operation.

Considering a conventional cycle of the motor 83, and starting with the piston 89' in its maximum upward position with both inlet port 87' and discharge port 88' being closed to chamber 100', inlet port 87' is initially opened admitting hot expanded gases to chamber 100' which impinge on the piston 89' driving the same in a downward direction in the cylinder 86'. Approximately halfway between the top and bottom position of the piston in the cylinder, the intake port 87' is closed to chamber 100' and the air trapped in chamber 100' is permitted to pass through a phase of adiabatic expansion thereby driving the piston to its lower most position in the cylinder. At this point the discharge port 88' is opened to the chamber 100' by valve 97' so that as the piston moves upwardly in the cylinder the air in chamber 100' is discharged through discharge passage 95' to the atmosphere. Upon the piston reaching its maximum upward position, the discharge port 88' is closed to chamber 100' and the cycle of operation of the motor is completed. Upon the opening of the inlet port 87' to chamber 100', a new cycle of operation is initiated.

While the speed of the engine is readily controlled by controlling the heat of the air in the chamber 85, a further engine speed control may be provided in the form of a butterfly-type valve 113 disposed in the passage 114 connecting the compressor inlet passage 94 to the atmosphere so as to control the volume of air flow into the compressor. Further, the engine speed could also be controlled by controlling the rate of fuel being utilized for the internal combustion in chamber 105 at assembly 113.

Figure 4:
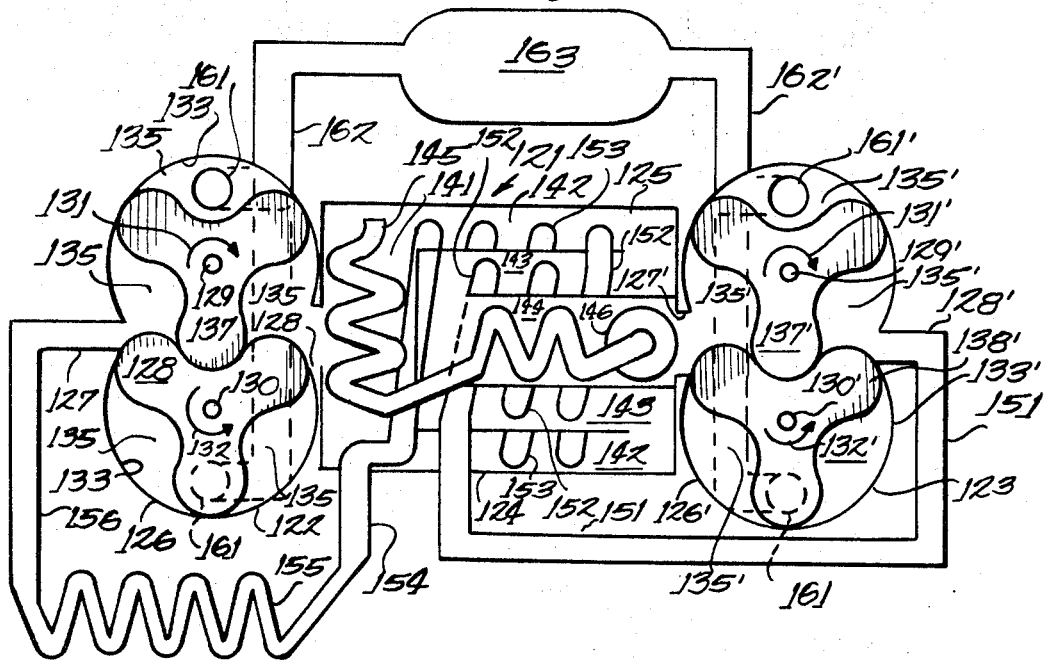
FIG. 4 is a diagrammatic view of a further embodiment of the present invention illustrating an external combustion engine similar to FIG. 2 but having a pressure recovery system and utilizing a three-lobe rotor type compressor and motor.

Referring now to FIG. 4 there is disclosed a further embodiment of the present invention wherein the reference numeral 121 generally indicates an external combustion engine which comprises a positive displacement compressor 122 and a motor 123 interconnected by a casing 124 having a chamber 125 therein.

The compressor 122 is of the three lobe rotary type and comprises a housing 126 having an inlet port 127 and an outlet port 128 with three-lobe rotors 127 and 128 which are rotatively mounted on shafts 129 and 130 for rotation in opposed directions as indicated by the arrows 131 and 132 respectively. The outer peripheral portions of each rotor 127, 128 is disposed in continuous sealing engagement with the inner surface 133 of the compressor housing 122. The outer peripheral surfaces of the rotors are in continuous rotative sealing engagement with the adjacent portions of each other so that at all times, including during rotation, the inlet port 127 is sealed from the outlet port 128. A series of working chambers 135 are defined between the outer peripheral surfaces of the rotors 127, 128 and the interior surface 133 of the compressor housing. It will be apparent that, as the rotors rotate relative to one another and relative to the housing 122, the working chambers 135 between the peripheral surfaces of the rotors 127 and 128 and the adjacent portions of the interior housing surface 133 will transport working gas from inlet port 127 to outlet port 128 to be discharged to chamber 142.

The motor 123 is substantially identical to the compressor 122 so that like reference numerals have been utilized to designate like parts 123' through 135' respectively.

The compressor outlet port 128 is connected to one end of the chamber 125, with the inlet port 127' of the motor 123 being connected to the opposite end of the chamber 125. The chamber 125 is divided into a plurality of interconnected chambers and passages 141 to 144 forming a tortuous path for the gas flow through the chamber.

Disposed along chamber 144 and extending along chamber 141 are heat exchanger coils 145 receiving heat from an external heat source (not shown) or from an external combustion chamber 146 which may be disposed in chamber 144. The outlet port 128' of motor 123 is connected to the inlet port 127 of the compressor 122 by means of passages 151, heat exchange coils 152 disposed in passages 143, heat exchange coils 153 disposed in passages 142, passage 154, air cooled heat exchange coils 155, and passage 156 which connects to compressor inlet port 127. In this manner the hot gas which is discharged from the motor 123 is directed through heat exchange coils 152 and 153 into the chamber 125 for use in heating the gas in the chamber, after which the gas stream is directed by passage 154 to a heat exchanger which cools the gas back to the desired temperature prior to the gas being recycled through passage 156 back into the compressor 122 for cycling again through the engine.

To assist in compressing the gas in the compressor 122, and for recovering a portion of the energy of the compressed gas which would otherwise be discharged from the motor and wasted due to incomplete adiabatic expansion in the motor 123, there are provided ports 161 in the compressor 122 interconnected by a passage 162, along with ports 161' in the motor interconnected by a passage 162', with passages 162 and 162' being interconnected by means of a pressure holding tank 163. In this manner the pressure is equalized between the chambers 135 and 135' as these chambers are moved by the rotors so as to momentarily come in contact with the ports 161, 161'. In this manner the increased pressure at the motor 123 is discharged through the passages 162, 162' and assists the compressor in compressing the air in chambers 135.

In operation, the gas in chamber 125 is heated by coils 145 causing the expansion of the gas and the increase of pressure of the same, the heated expanded gas acting on the motor rotors 127', 128' effecting the rotation of the same and their respective shafts 129', 130'. The motor shafts are connected to a motor output (not shown) which is connected to the load to be dirven (not shown) as well as being mechanically connected by suitable means to the compressor shafts 129, 130 so that the motor and compressor rotors always turn in a given ratio with the motor always turning at a speed such that the volume of gas passing therethrough is greater than that passing through the compressor.

As the motor turns, the compressor rotors turn thus discharging fresh compressed gas through outlet port 128 into the chamber 125. The gas stream first contacts heating coils 145, after which the air flow streams along interconnected passages 142 and 143 contacting coils 153 and 152 respectively which further heat and expand the gas, with the air stream then flowing through chamber 144 and passing over coils 145 and combustion chamber 146 still further heating and expanding the gas prior to its discharge from chamber 125 into motor inlet port 127'. The motor rotors 127', 128' are driven by the hot gases acting thereon, after which the gases are discharged through discharge outlet 128' and pass through passage 151 to be directed into heating coils 152, 153 for recovery of the heat in the discharged gases for utilization in heating the air in the chamber 125, after which the air flows through passage 154 to cooling coils 155 where the gas is cooled to the desired temperature prior to its being reintroduced to the compressor by passage 156 connected to compressor inlet port 127. In addition, a portion of the heated compressed gas flows through ports 161' to be discharged into the compressor housing at ports 161 for assisting in compressing the air in the compressor 122 prior to discharge of the compressed fresh air into the chamber 125.

As in the other embodiments, it is to be noted that the air stream through the chamber 125 is arranged such that the air is continually heated and further expanded as it progresses through the tortuous path of the chambers 141 through 144, with the coolest air flowing in the outermost passages 142 thereby providing a cool air insulating blanket adjacent the interior of the casing 124 to prevent excessive loss of heat from the engine while minimizing the cooling or insulation required externally of the engine casing.

As previously discussed, by utilizing a closed-loop system for an external-combustion engine it is possible to maximize the efficiency of the engine by prepressurizing the gas used in the system along with the selecting of the gas best suited for the working temperatures and pressures involved. An example would be the use of helium as the working gas and prepressurizing the closed-loop system to a value of about 10 atmospheres which would greatly increase the efficiency of the engine.

It is to be understood that the form of this invention herewith shown and described is to be taken as a preferred example of the same, and that various changes in the shape, size, and arrangement of parts may be resorted to without departing from the spirit of the invention or the scope of the subjoined claims.

What I claim is:

1. A hot gas engine comprising:
   a casing having a chamber therein;
   heating means disposed in said chamber for supplying heat thereto;
   intake means connected to said casing for supplying a gas to said chamber and including a housing having an inlet port and an outlet port, said outlet port being in communication with said chamber for introducing gas therein;
   motor means connected to said casing for receiving gas from said chamber and including a housing having an inlet port and an outlet port, said inlet port being in communication with said chamber for receiving gas therefrom, said gas performing work on said motor means by driving the same, after which said gas is discharged from said motor means through said outlet port;
   said chamber being continuously closed off from said intake means inlet port and said motor outlet port;
   said motor means drivingly connected to said intake means for driving the same at a selectable ratio relative to the speed of said motor means, said ratio being selected so that the volume of gas passing through the motor means is greater than the volume of gas passing through the intake means;
   means interconnecting a gas compression stage provided in said intake means housing with a gas expansion stage provided in said motor means housing for equalizing the pressure of the gas passing through said interconnected compression and expansion stages;
   whereby said heating means heats the gas in said chamber between the intake means and motor means effecting the expansion thereof with an associated increased pressure buildup in said chamber, this pressure increase forcing the gas out of said chamber to perform work on said motor means, said motor means in turn driving said intake means to admit fresh gas to said chamber.

2. The hot gas engine as set forth in claim 1 further characterized by:
   said intake means inlet port being in communication with said motor means outlet port so as to form a closed loop system for directing the gas flow therebetween; and
   cooling means disposed between said intake means inlet port and said motor means outlet port for cooling the hot exhaust gas discharged from said motor means prior to said gas being introduced into said intake means.

3. The hot gas engine as set forth in claim 1 further characterized by:
   a combustion chamber formed in a portion of said chamber;
   a combustionable working fluid introduced into said combustion chamber; and
   ignition means associated with said combustion chamber for initiating combustion of the working fluid thereby introducing heat into said chamber.

4. The hot gas engine as set forth in claim 1 further characterized by:
   said chamber being divided into first and second gas flow passageways for directing the flow of gas through the engine, said first passageway directing the fresh gas introduced by said intake means along the interior surfaces of said chamber thereby generally forming an insulation blanket of cool gas immediately adjacent said interior chamber surfaces, said second passageway receiving the gas from said first passageway and directing it over a tortuous path through the remainder of said chamber; and
   said heating means comprising a heat exchanger including heat exchanging coils disposed along said second passageway with the coolest coil being disposed nearest the end of said second passageway adjoining said first passageway and the hottest coil being disposed nearest the opposite terminal end of said second passageway so that gas introduced from said first passageway initially contacts the coolest heat exchange coil with the gas expanding and absorbing heat from continually hotter coils as the gas progressively flows through said second passageway over said coils until the discharge of the gas from said chamber to said motor means.

5. The hot gas engine as set forth in claim 1 further characterized by said intake means comprising:
   a cylinder having an inlet valve and an outlet valve;
   a piston disposed for reciprocating movement in said cylinder;
   a variable volume working chamber defined in said cylinder between said valves and said piston;
   a drive shaft eccentrically connected to said piston so that rotation of said drive shaft effects the reciprocation of said piston; and
   means associated with said drive shaft to sequentially operate said valves;
   whereby gas is introduced to said working chamber, compressed therein by said piston, and the compressed gas is exhausted therefrom through said outlet valve in communication with said chamber.

6. The hot gas engine as set forth in claim 1 further characterized by said motor means comprising:
   a cylinder having an inlet valve and an outlet valve;
   a piston disposed for reciprocating movement in said cylinder;
   a variable volume working chamber defined in said cylinder between said valves and said piston;
   a driven shaft eccentrically connected to said piston so that reciprocation of said piston effects the rotation of said drive shaft; and
   means associated with said driven shaft to sequentially operate said valves;
   whereby the heated gas is received in said working chamber from said chamber, expands and cools in said working chamber performing work on said piston, after which the gas is discharged from the working chamber through said outlet valve.

7. The hot gas engine as set forth in claim 1 further characterized by:
   a gas flow control means associated with said intake means inlet port for controlling the volume and flow of gas introduced to said intake means through said outlet port.

8. The hot gas engine as set forth in claim 1 further characterized by:
   bypass means operable to provide communication between said chamber and the ambient atmosphere so that operating said bypass means shunts gas from said chamber to the atmosphere to relieve the heat and pressure in said chamber thereby providing a breaking torque effect on said motor means.

9. The hot gas engine as set forth in claim 1 further characterized by:

heat exchange means associated with said chamber and said motor means outlet port and disposed in heat-exchanging relationship with the hot exhaust gas discharged through said motor outlet port for abstracting heat therefrom and introducing said abstracted heat into said chamber.

10. The hot gas engine as set forth in claim 2 further characterized by:

said gas in said closed loop system being pre-pressurized to a selected value above ambient atmospheric pressure.

11. The hot gas engine as set forth in claim 1 further characterized by:

auxiliary intake means including a housing having an inlet port and an outlet port, said inlet port receiving fresh gas, said outlet port in communication with said intake means inlet port, whereby fresh gas is initially compressed by said auxiliary intake means thereby increasing the volume and density of the gas introduced to said intake means and eventually to said chamber so as to increase the compression ratio of the engine.

12. The hot gas engine as set forth in claim 1 wherein said means interconnecting the gas compression stage and the gas expansion stage comprises a conduit directly interconnecting said stages.

* * * * *